United States Patent
Ko et al.

(10) Patent No.: US 9,148,052 B2
(45) Date of Patent: Sep. 29, 2015

(54) SWITCHING REGULATOR WITH REDUCED EMI

(75) Inventors: Yus Ko, Yongin-Si (KR); Dong Jin Keum, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 315 days.

(21) Appl. No.: 13/426,638

(22) Filed: Mar. 22, 2012

(65) Prior Publication Data

US 2012/0242313 A1   Sep. 27, 2012

(30) Foreign Application Priority Data

Mar. 23, 2011   (KR) .......................... 10-2011-0025845

(51) Int. Cl.
  *G05F 1/575*   (2006.01)
  *H02M 1/44*   (2007.01)
  *H02M 1/00*   (2007.01)

(52) U.S. Cl.
  CPC ........ *H02M 1/44* (2013.01); *H02M 2001/0025* (2013.01)

(58) Field of Classification Search
  CPC ................................. H02M 3/156; G05F 1/46
  USPC ................................. 323/282, 285, 288, 351
  See application file for complete search history.

(56) References Cited

U.S. PATENT DOCUMENTS

| | | | |
|---|---|---|---|
| 7,764,057 B2 | 7/2010 | Groom | |
| 7,957,162 B2 | 6/2011 | Choi et al. | |
| 2012/0242313 A1* | 9/2012 | Ko et al. | 323/282 |
| 2013/0234682 A1* | 9/2013 | Yoon et al. | 323/234 |
| 2014/0191744 A1* | 7/2014 | Choi et al. | 323/283 |

FOREIGN PATENT DOCUMENTS

| | | |
|---|---|---|
| EP | 2154771 A1 | 2/2010 |
| KR | 1020080049309 A | 6/2008 |
| KR | 1020090098567 A | 9/2009 |

* cited by examiner

*Primary Examiner* — Jeffrey Sterrett
(74) *Attorney, Agent, or Firm* — Volentine & Whitt, PLLC

(57) ABSTRACT

The switching regulator includes a voltage-to-current converter to convert a noise voltage into a noise current and output the noise current; and a sawtooth generator to output a sawtooth voltage signal having a frequency that varies in response to the noise current output from the voltage-to-current converter.

20 Claims, 10 Drawing Sheets

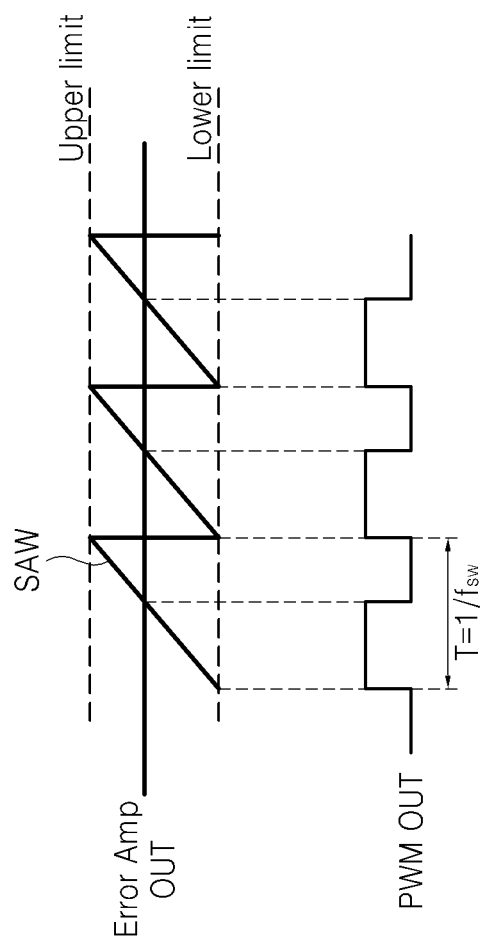

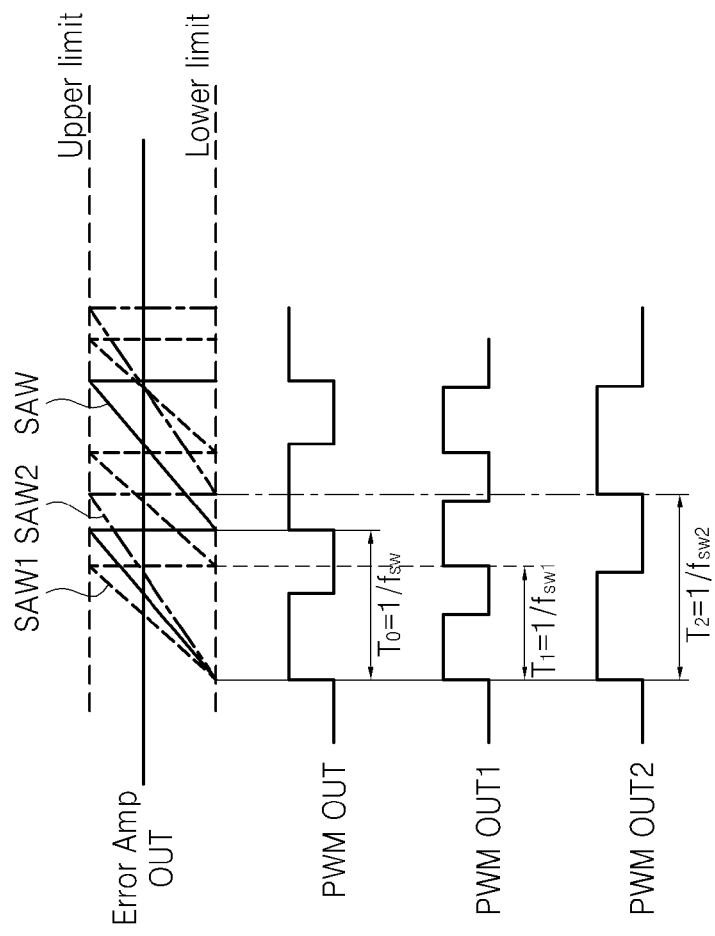

SWITCHING REGULATOR WITH REDUCED EMI

CROSS-REFERENCE TO RELATED APPLICATIONS

This application claims priority under 35 U.S.C. §119(a) from Korean Patent Application No. 10-2011-0025845 filed on Mar. 23, 2011, the disclosure of which is hereby incorporated by reference in its entirety.

BACKGROUND

Example embodiments relate to a switching regulator, and more particularly, to a switching regulator capable of exhibiting reduced electromagnetic interference (EMI), a method of operating the switching regulator, and an electronic device including the switching regulator.

As EMI appears as a big problem in recent mobile communication systems, various techniques of reducing EMI have been developed.

Some devices employ a large filter and/or shielding in order to reduce EMI. However, these measures increase the cost and size of the device. The size of an EMI filter may be reduced by using a spread spectrum technique. However, this still has its own disadvantages.

SUMMARY

The present invention provides a switching regulator capable of exhibiting reduced electromagnetic interference (EMI) by outputting a sawtooth voltage signal having a frequency that varies by using noise, a method of operating the switching regulator, and an electronic device including the switching regulator.

According to an aspect of the present invention, there is provided a device comprising a switching regulator. The switching regulator includes: a voltage-to-current converter configured to convert a noise voltage signal into a noise current and output the noise current; and a sawtooth generator to output a sawtooth voltage signal having sawtooth waveform, wherein a frequency of the sawtooth waveform varies according to the level of the noise current output from the voltage-to-current converter.

The device further comprises a switch circuit disposed between the voltage-to-current converter and the sawtooth generator to transmit the noise current output from the voltage-to-current converter to the sawtooth generator. The device may further comprise a capacitor connected between an input terminal of the switching regulator via which noise is input, and an input terminal of the voltage-to-current converter via which the noise voltage is input.

The noise voltage may be generated from clock noise, switching noise, or substrate coupling noise. The switching regulator may be integrated into a single semiconductor chip or integrated circuit.

The voltage-current converter may comprise an operational amplifier configured to amplify and output an input voltage formed by adding the noise voltage, to or subtracting the noise voltage from, a DC voltage output from a power source; and a current mirror circuit to convert the amplified input voltage signal into an input current signal and remove a DC component from the input current to output the noise current.

The current mirror circuit may comprise an NMOS transistor comprising a gate connected to an output terminal of the operational amplifier; a resistor comprising a first end connected to a source of the NMOS transistor and a second end connected to ground; a first PMOS transistor comprising a first end connected to a drain of the NMOS transistor and a second end connected to a power supply source; and a second PMOS transistor comprising a gate connected to a gate of the first PMOS transistor, a source connected to the power supply source, and a drain connected to the ground. The noise current obtained by removing the DC component from the input current is output via an output terminal connected to a drain of the second PMOS transistor.

The sawtooth generator comprises a capacitor for converting the noise current into the sawtooth voltage signal and outputting the sawtooth voltage signal. The switching regulator further comprises a pulse-width modulation (PWM) comparison circuit to compare the sawtooth voltage signal output from the sawtooth generator with a reference voltage to output a PWM signal. The switching regulator may be part of a power management circuit.

According to another aspect of the present invention, there is provided a power management circuit comprising the switching regulator, and a controller configured to convert the pulse width modulation signal output from the switching regulator into a driving signal and to output the driving signal.

According to another aspect of the present invention, there is provided an electronic device comprising the power management circuit and a peripheral circuit including a driving circuit that operates in response to the driving signal.

According to another aspect of the present invention, there is provided a method of operating a switching regulator, the method comprising converting, by a voltage-to-current converter, a noise voltage into a noise current and outputting the noise current and outputting, by a sawtooth generator, a sawtooth voltage signal having a sawtooth waveform, wherein a frequency of the sawtooth waveform varies according to the level of the noise current.

The converting comprises amplifying and outputting, by an operational amplifier, an input voltage signal formed by adding the noise voltage to, or subtracting the noise voltage signal from, a DC voltage, output from a power source; and converting, by a current mirror circuit, the amplified input voltage signal into an input current signal and then removing a DC component from the input current to output the noise current.

According to yet another aspect of the invention, a device includes: a sawtooth generator configured to receive a noise current and in response thereto to output a sawtooth voltage signal having sawtooth waveform with a variable period, wherein the variable period of the sawtooth waveform varies in response to the noise current; and a pulse width modulation (PWM) signal generator configured to receive the sawtooth voltage signal having the sawtooth waveform with the variable period, and receiving a comparison voltage, and to compare the sawtooth voltage signal to the comparison voltage and in response thereto to output a pulse width modulation signal having a variable frequency, wherein the variable frequency varies in response to the noise current.

In some embodiments, the device may also include an error amplifier configured to supply the comparison voltage to the PWM signal generator, wherein the error amplifier is configured to receive an error signal representing a difference between a regulated output voltage and a target voltage to which the regulated voltage should be set, wherein the comparison signal varies in response to the regulated output voltage.

In some embodiments, the device may also include a voltage-to-current converter configured to convert a noise voltage into the noise current and to output the noise current to the sawtooth voltage generator.

In some embodiments, the device may also include a controller configured to convert the PWM signal output from the PWM signal generator into a driving signal and to output the driving signal.

In some embodiments, the device may also include a peripheral circuit including a driving circuit that operates in response to the driving signal.

In some embodiments, the device may also include a switching device configured to selectively supply the noise current to the sawtooth generator

BRIEF DESCRIPTION OF THE DRAWINGS

Exemplary embodiments of the present invention will be more clearly understood from the following detailed description taken in conjunction with the accompanying drawings in which:

FIGS. 5A and 5B illustrate output waveforms of the switching regulator illustrated in FIG. 4;

DETAILED DESCRIPTION OF THE EMBODIMENTS

Figure 1:
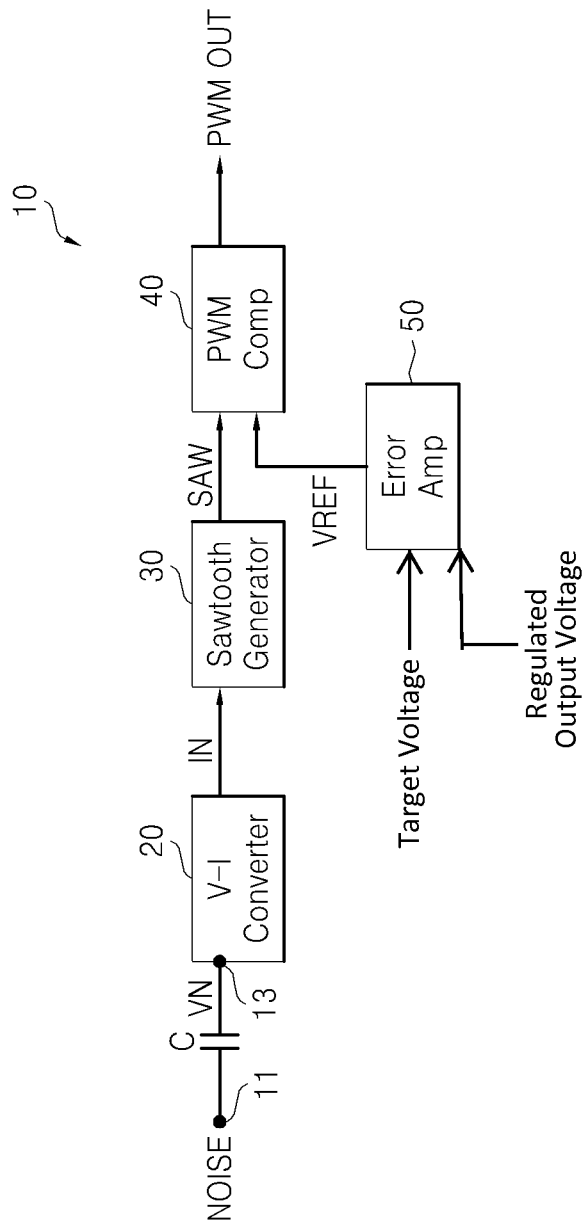
FIG. 1 is a block diagram of one embodiment of a switching regulator.

Exemplary embodiments now will be described more fully hereinafter with reference to the accompanying drawings. The exemplary embodiments may, however, be embodied in many different forms and should not be construed as limited to the embodiments set forth herein. Rather, these embodiments are provided so that this disclosure will be thorough and complete. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of one embodiment of a switching regulator 10. Referring to FIG. 1, switching regulator 10 includes a voltage-to-current converter 20, a sawtooth generator 30, a pulse-width modulation (PWM) comparison circuit 40, and an error amplifier 50.

Voltage-to-current converter 20 converts a noise voltage VN into a noise current IN and outputs the noise current IN. In some cases, switching regulator 10 may further include a capacitor C connected between an input terminal 11 of switching regulator 10 via which noise NOISE is input, and an input terminal 13 of voltage-to-current converter 20 to which the noise voltage VN is input.

The capacitor C concentrates the noise NOISE generated in switching regulator 10, for example, clock noise, switching noise, or substrate coupling noise, on input terminal 11, and thus generates the noise voltage VN, which is input to voltage-to-current converter 20.

Figure 2:
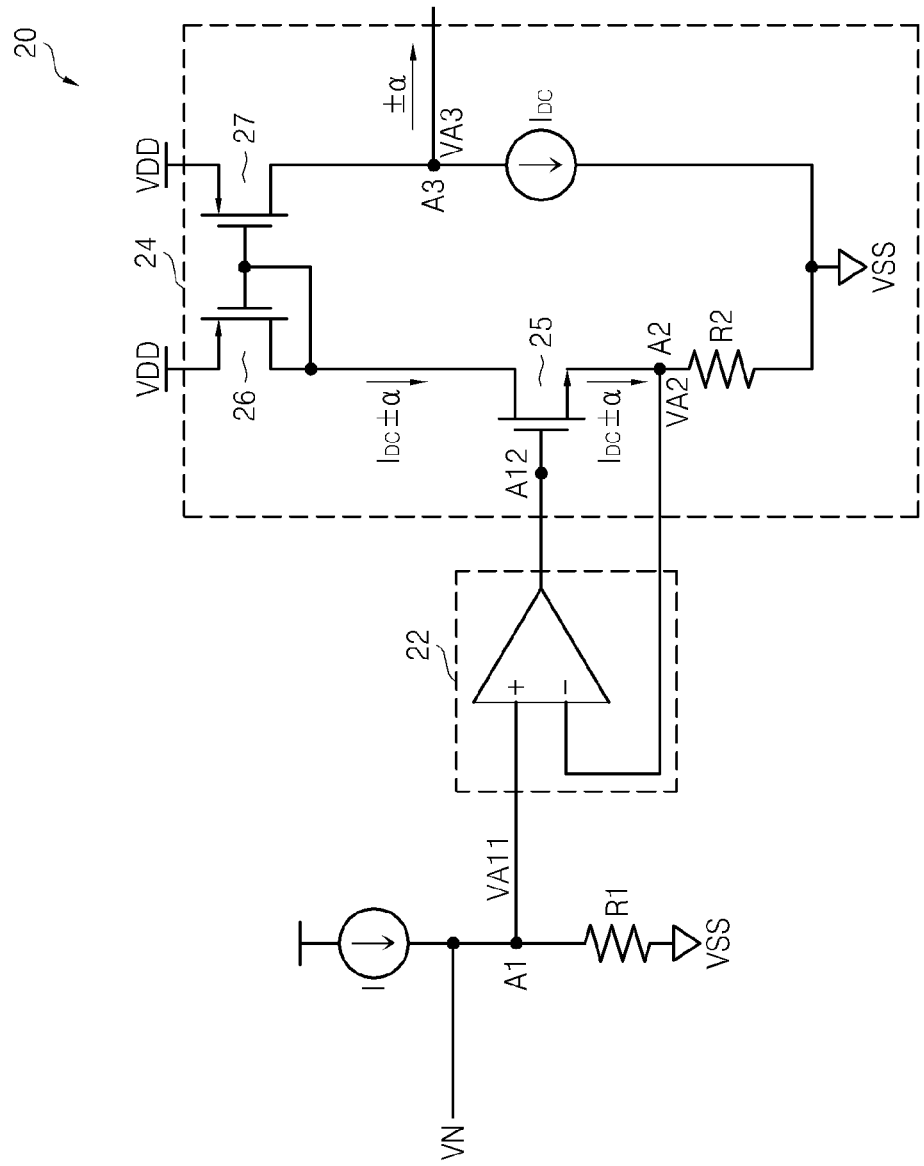
FIG. 2 is a circuit diagram of one embodiment of a voltage-current converter included in the switching regulator illustrated in FIG. 1.

FIG. 2 is a circuit diagram of one embodiment of voltage-current converter 20 illustrated in FIG. 1. Referring to FIGS. 1-2, voltage-to-current converter 20 includes an operational amplifier 22 and a current mirror circuit 24.

Operational amplifier 22 amplifies and outputs an input voltage VA11 obtained by adding the noise voltage VN to, or subtracting the noise voltage VN from, a direct current (DC) voltage VA1, which is generated at node A1 by a current I and a resistor R1. The DC voltage VA1 is may be represented as a product of current I and R1. In other words, VA1=I*R1, and VA11=VA1±VN.

The current I is generated from a reference block (not shown) that produces a current. The current I corresponds to a current formed by regulating a voltage generated by a power supply source VDD by using the reference block. The resistance R1, in combination with the current I, sets the DC voltage VA1.

A first input terminal (+) of operational amplifier 22 is connected to the node A1 to receive the input voltage VA11, and a second input terminal (−) of operational amplifier 22 is connected to a node A2. Operational amplifier 22 may be a buffer.

Current mirror circuit 24 includes an NMOS transistor 25, a first PMOS transistor 26, a second PMOS transistor 27, and a resistor R2. A gate of NMOS transistor 25 is connected to an output terminal A12 of operational amplifier 22. The resistor R2 is connected between the node A2 and ground VSS. A drain of first PMOS transistor 26 is connected to that of NMOS transistor 25, and a source of first PMOS transistor 26 is connected to the power supply source VDD.

A gate of second PMOS transistor 27 is connected to that of first PMOS transistor 26, a source of second PMOS transistor 27 is connected to the power supply source VDD, and a drain of second PMOS transistor 27 is connected to the ground VSS via a current source IDC of a reference block (not shown).

Current mirror circuit 24 converts a voltage of the node A2 into an input current IDC±α and then removes a DC component IDC from the input current IDC±α to output the noise current IN (=±α).

The input voltage VA11 and an output voltage VA2 of operational amplifier 22 have similar values due to a feedback circuit.

Under the assumption that the output voltage VA2 of operational amplifier 22 is equal to the input voltage VA11, the input current IDC±α may be represented as the output voltage VA2 for the value of the resistor R2. In other words, the input current IDC±α is equal to VA11/R2=(I*R1+VN)/R2. Here, IDC=I*R1/R2, and ±α=VN/R2.

In an operation of current mirror circuit 24, a voltage VA2 of the source of NMOS transistor 25 is converted into the input current IDC±α, and the input current IDC±α flows in the drain of first PMOS transistor 26 and also in the drain of second PMOS transistor 27, which forms a mirror pair together with first PMOS transistor 26.

The DC component IDC flows to the ground VSS via the current source of the reference block (not shown), and the noise current IN (=±α), excluding the DC component IDC, is output via an output terminal A3 connected to the drain of second PMOS transistor 27. A voltage VA3 appears at output terminal A3.

Figure 3:
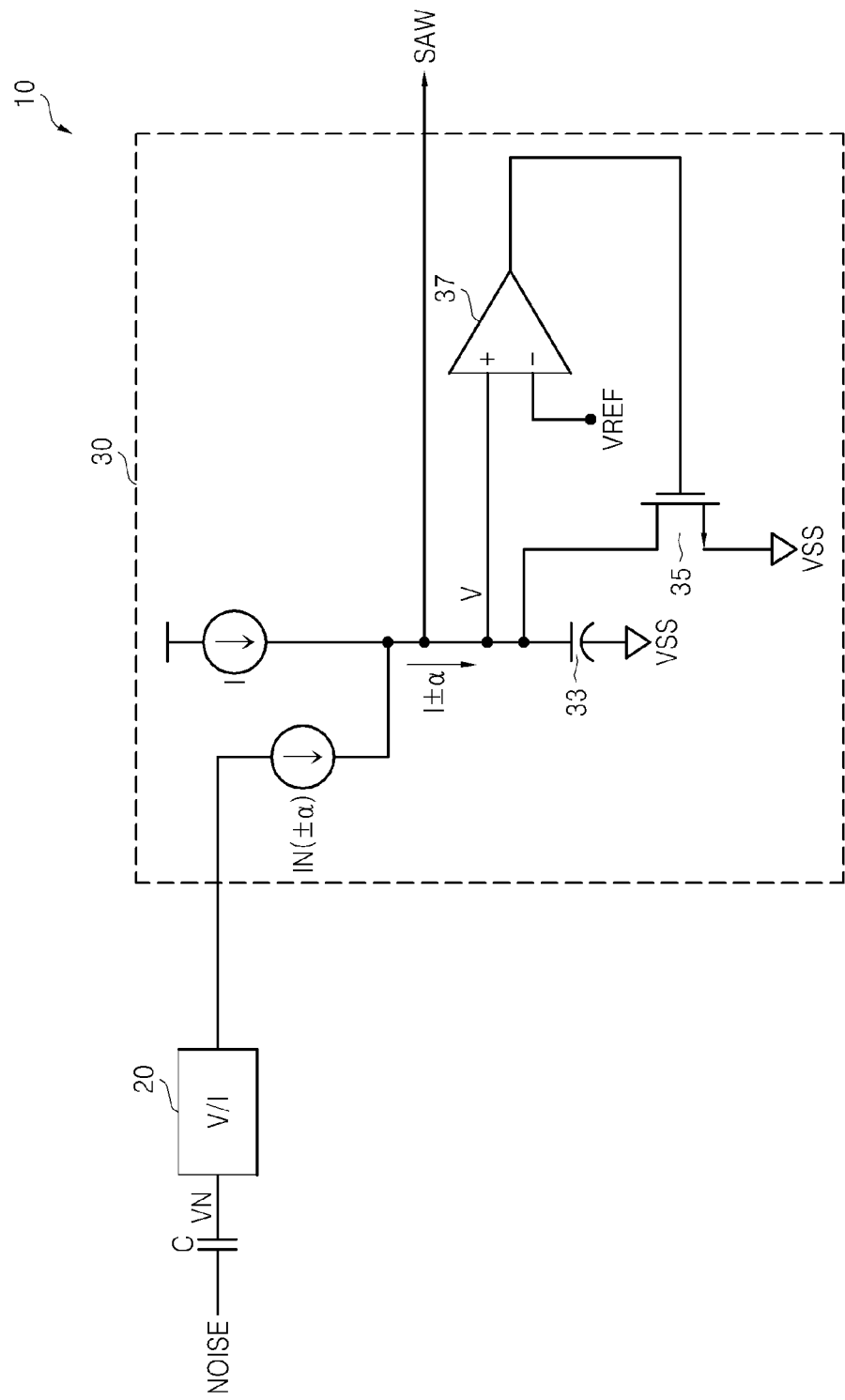
FIG. 3 is a circuit diagram of a portion of one embodiment of switching regulator as illustrated in FIG. 1, showing details of one embodiment of a sawtooth generator.

FIG. 3 is a circuit diagram of a portion of one embodiment of switching regulator 10 as illustrated in FIG. 1, showing details of one embodiment of sawtooth generator 30. Referring to FIGS. 1 and 3, sawtooth generator 30 includes a capacitor 33, a comparator 37, and an NMOS transistor 35.

Sawtooth generator 30 generates a variable current I±α having a variable frequency by adding the noise current IN (=±α) output from voltage-to-current converter 20 to, or subtracting the noise current IN (=±α) from, a sawtooth reference current I received from a current source of a reference block (not shown). The variable current I±α repeatedly charges and discharges capacitor 33 and outputs a sawtooth voltage signal SAW having a sawtooth waveform with a frequency that varies according to the levels of the noise current IN (=±α).

Error amplifier 50 amplifies a voltage into which a feedback resistor string is divided at the output of switching regulator 10 and an error signal of a reference voltage produced by a reference block (not shown), thereby generating and outputting a reference or comparison voltage VREF, which is to be compared by PWM comparison circuit 40 with the sawtooth voltage signal SAW. In some embodiments, the error signal may represent a difference between a regulated supply voltage (e.g., a driving signal output by a power management circuit) and a target voltage to which the regulated supply voltage should be set in response to a PWM output signal PWM OUT of PWM comparison circuit 40.

PWM comparison circuit 40 compares the sawtooth voltage signal SAW output by sawtooth generator 30 with the reference voltage VREF output by error amplifier 50 to generate and output a PWM signal PWM OUT having a variable frequency.

Figure 4:
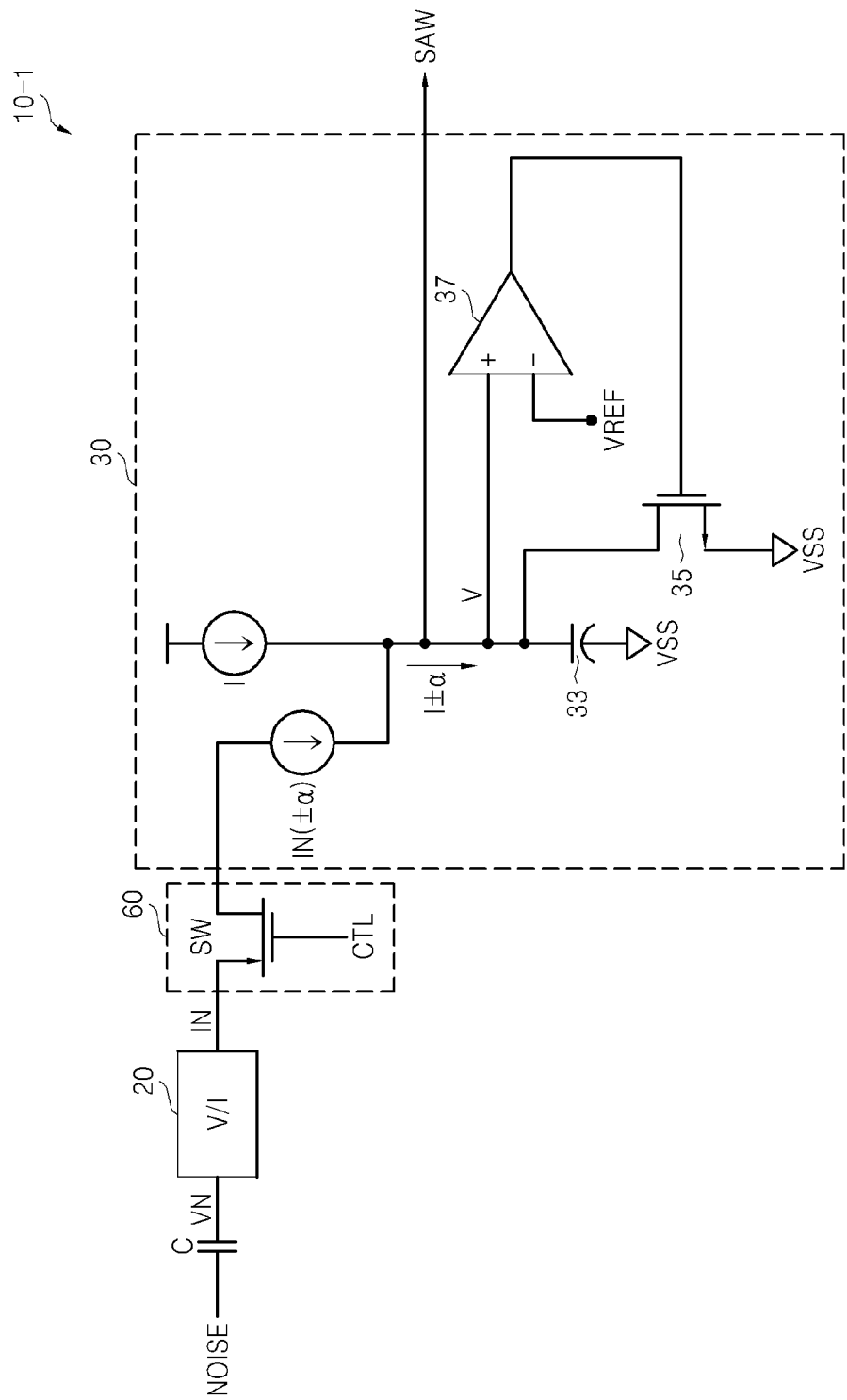
FIG. 4 is a block diagram of a portion of another embodiment of a switching regulator, showing details of one embodiment of a sawtooth generator.

FIG. 4 is a block diagram of a portion of another embodiment of a switching regulator 10-1, showing details of one embodiment of a sawtooth generator Referring to FIG. 4, switching regulator 10-1 is the same as switching regulator 10 of FIG. 3 except that switching regulator 10-1 includes a switching circuit 60, including a switching device SW, between voltage-to-current converter 20 and sawtooth generator 30 for selectively transmitting and selectively blocking the noise current IN output from voltage-to-current converter 20 to sawtooth generator 30.

The switching device SW may be a semiconductor device, for example, a PMOS transistor. The switching device SW operates in response to a control signal CTL. Switching regulator 10 or 10-1 may be integrated into a single semiconductor chip or integrated circuit.

FIGS. 5A and 5B illustrate output waveforms of switching regulator 10-1 illustrated in FIG. 4. FIG. 5A illustrates an output waveform of switching regulator 10-1 when the switching circuit SW is switched OFF, in which case no noise current is added to the sawtooth reference current I. FIG. 5B illustrates an output waveform of switching regulator 10-1 when the switching circuit SW is switched ON, in which case the noise current is added to the sawtooth reference current I.

Referring to FIGS. 4 and 5A, the sawtooth voltage signal SAW generated in sawtooth generator 30 of switching regulator 10-1 moves within the range of an upper limit to a lower limit and is compared with the output (VREF) of error amplifier 50 to generate a PWM signal PWM OUT having a constant pulse width, that is, having a fixed frequency.

Since the period T=1/fsw of the sawtooth voltage signal SAW output by sawtooth generator 30 to which no noise current is added is maintained at a constant value, the sawtooth voltage signal SAW having a constant frequency is generated, as illustrated in FIG. 5A. In the period T (=1/fsw), a reference frequency fsw denotes the frequency of the sawtooth voltage signal SAW.

Referring to FIGS. 4 and 5B, sawtooth generator 30 outputs a sawtooth voltage signal SAW1 or SAW2, which varies in response to the noise current IN received with switching circuit 60, and therefore deviates from the sawtooth voltage signal SAW which has the fixed frequency fsw.

A current of the sawtooth voltage signal SAW1, which is output by sawtooth generator 30 which receives the noise current IN, is increased by an amount of +α due to the noise current IN, so that the sawtooth voltage signal SAW1 has a greater slope and a shorter period than T0=T (i.e., 1/fsw), such as a first period T1 (=1/fsw1). Thus, a first frequency fsw1 is greater than the reference frequency fsw of the sawtooth voltage signal SAW. The first frequency fsw1 is the frequency of the sawtooth voltage signal SAW1.

On the other hand, when a current of the sawtooth voltage signal SAW2 is decreased by an amount of −α due to the noise current IN, the sawtooth voltage signal SAW2 has a lesser slope and a greater period than T0, such as a second period T2 (=1/fsw2). Thus, a second frequency fsw2 is less than the reference frequency fsw of the sawtooth voltage signal SAW. The second frequency fsw2 is the frequency of the sawtooth voltage signal SAW2.

As described above, by using the noise NOISE generated in switching regulator 10, PWM comparator 40 produces a PWM signal PWM OUT1 or PWM OUT2 whose frequency varies under the influence of the noise NOISE, whereby EMI may be reduced.

Figure 6:
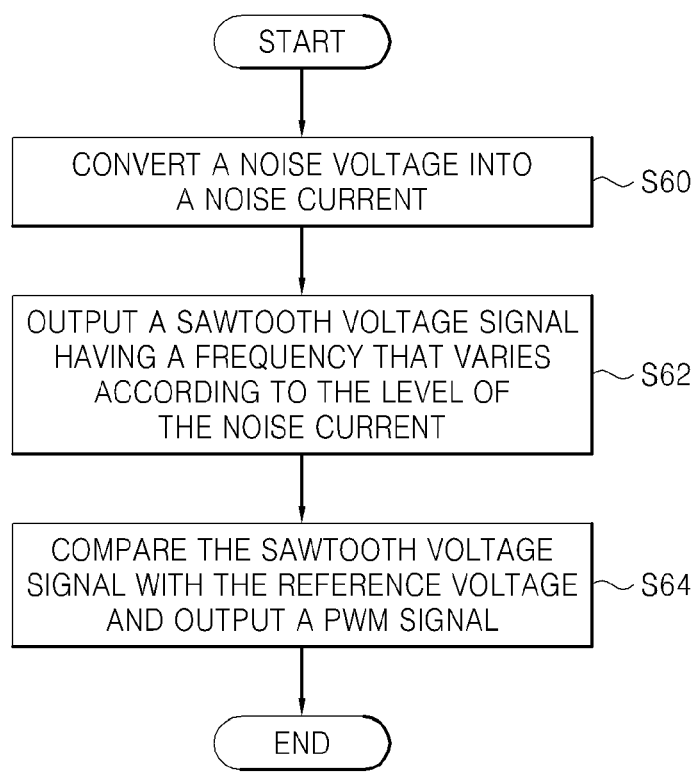
FIG. 6 is a flowchart of a method of operating the switching regulator illustrated in FIG. 1, according to an embodiment of the present invention.

FIG. 6 is a flowchart of a method of operating switching regulator 10, according to an embodiment of the present invention. Referring to FIGS. 1, 3, and 6, voltage-to-current converter 20 converts the noise voltage VN into the noise current IN and outputs the noise current IN, in operation S60.

In operation S62, sawtooth generator 30 outputs the sawtooth voltage signal SAW having a frequency that varies in response to the noise current IN (e.g., the frequency changes in correspondence to the level or magnitude of the noise current). In operation S64, PWM comparison circuit 40 compares the sawtooth voltage signal SAW output by sawtooth generator 30 with the reference voltage signal VREF output by error amplifier 40 to generate and output the PWM signal PWM OUT (which, e.g., may be PWM OUT1, PWM OUT2, etc.).

Figure 7:
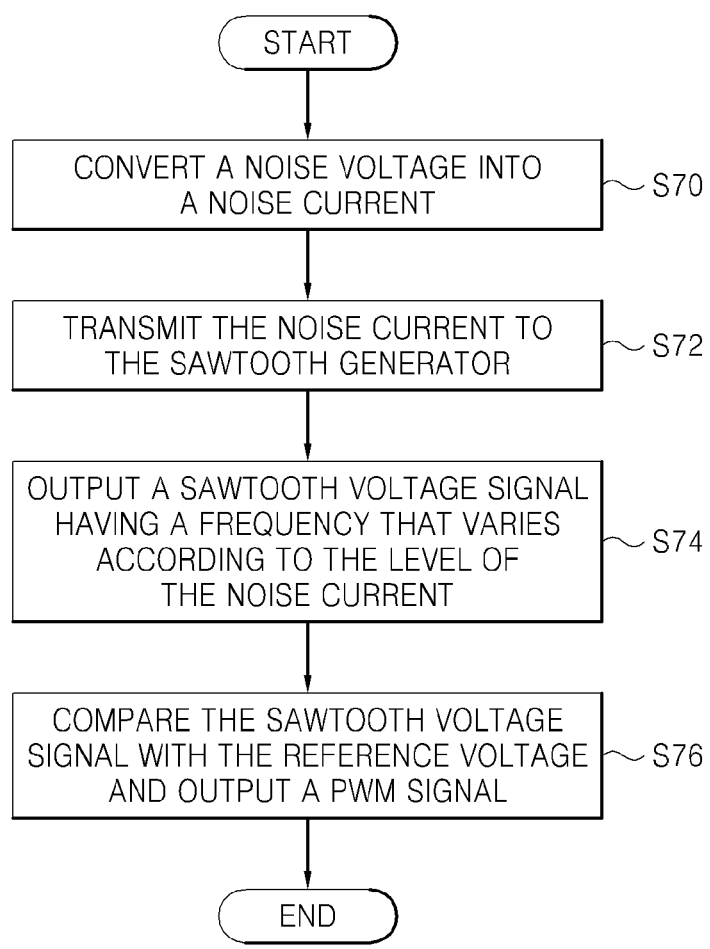
FIG. 7 is a flowchart of a method of operating the switching regulator illustrated in FIG. 4, according to an embodiment of the present invention.

FIG. 7 is a flowchart of a method of operating the switching regulator 10-1, according to an embodiment of the present invention. Referring to FIGS. 1, 4, and 7, voltage-to-current converter 20 converts the noise voltage VN into the noise current IN and outputs the noise current IN, in operation S70.

In operation S72, the switching device SW transmits the noise current IN to sawtooth generator 30 when it is switched ON under the control of a control signal CTL, and does not transmit the noise current IN to sawtooth generator 30 when it is switched OFF under the control of the control signal CTL. In operation S74, when the switching device SW is switched ON and transmits the noise current IN to sawtooth generator 30, sawtooth generator 30 outputs the sawtooth voltage signal SAW having a frequency that varies in response to the noise current IN.

In operation S76, PWM comparison circuit 40 compares the sawtooth voltage signal SAW output by sawtooth generator 30 with the reference voltage signal VREF output by error amplifier 40 to generate and output the PWM signal PWM OUT.

Figure 8:
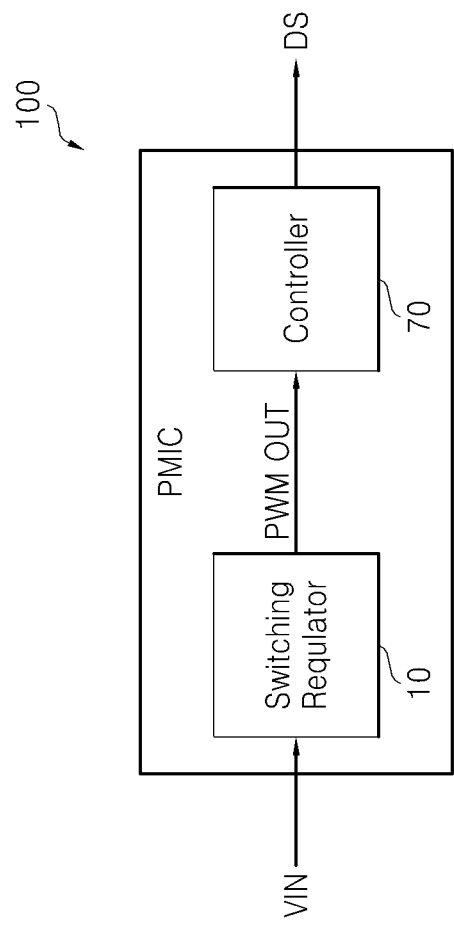
FIG. 8 is a block diagram of a power management integrated circuit (PMIC) including the switching regulator illustrated in FIG. 1 or 4.

FIG. 8 is a block diagram of a power management integrated circuit (PMIC) 100 including switching regulator 10 or 10-1 illustrated in FIG. 1 or 4. Referring to FIG. 8, PMIC 100 includes switching regulator 10 or 10-1 and a controller 70. PMIC 100 receives a power supply voltage VIN from a power source (for example, a battery).

The power supply voltage VIN is converted into the PWM signal PWM OUT having a variable frequency by switching regulator 10 or 10-1 included in PMIC 100, and a driving signal DS, which may be a supply voltage desired to operate a peripheral circuit, is output under the control of controller 70.

Figure 9:
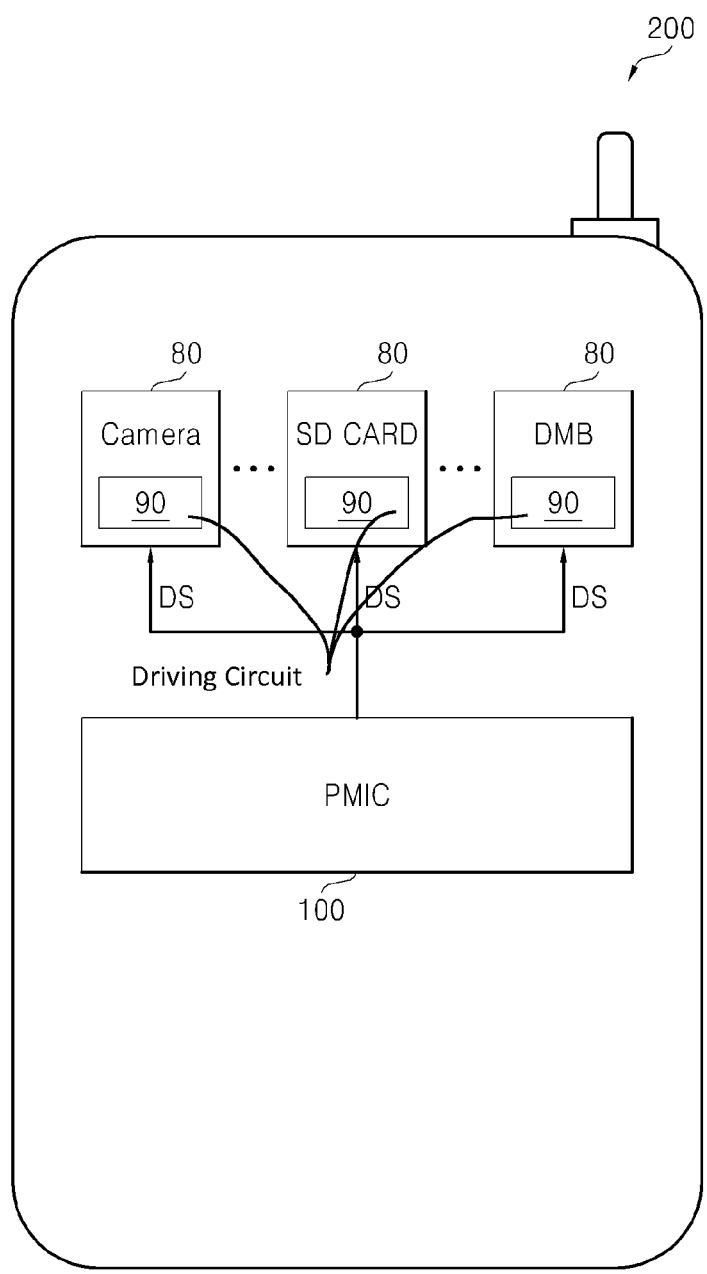
FIG. 9 is a block diagram of an electronic device including the PMIC of FIG. 8.

FIG. 9 is a block diagram of an electronic device 200 including PMIC 100 of FIG. 8. Referring to FIG. 9, electronic device 200 may be a cellular phone, a smart phone, a personal digital assistant (PDA), a personal navigation device (PND), a digital camera, or an MP3.

Electronic device 200 includes PMIC 100 and peripheral circuits 80. Peripheral circuits 80 may be a camera, a Digital Multimedia Broadcasting (DMB), an SD card, and a receiver. Each of peripheral circuits 80 includes a driving circuit 90, which is driven according to the driving signal DS (e.g., a supply voltage) output by PMIC 100.

In a switching regulator and an operating method thereof according to an embodiment of the present invention, a sawtooth voltage signal having a frequency that varies by using noise is output, so that EMI may be reduced.

While the present invention has been particularly shown and described with reference to exemplary embodiments thereof, it will be understood that various changes in form and details may be made therein without departing from the spirit and scope of the following claims.

What is claimed is:

1. A device, comprising:
a switching regulator, including:
a voltage-to-current converter configured to convert a noise voltage into a noise current and to output the noise current; and
a sawtooth generator to output a sawtooth voltage signal having a sawtooth waveform, wherein a frequency of the sawtooth waveform varies according to a level of the noise current output from the voltage-to-current converter.

2. The device of claim 1, further comprising a switch circuit between the voltage-to-current converter and the sawtooth generator to transmit the noise current output from the voltage-to-current converter to the sawtooth generator.

3. The device of claim 1, further comprising a capacitor connected between an input terminal of the switching regulator via which noise is input, and an input terminal of the voltage-to-current converter via which the noise voltage is input.

4. The device of claim 1, wherein the noise voltage is generated from clock noise, switching noise, or substrate coupling noise.

5. The device of claim 1, wherein the switching regulator is integrated into a single semiconductor chip.

6. The device of claim 1, wherein the voltage-current converter comprises:
an operational amplifier to amplify and output an input voltage formed by adding the noise voltage to, or subtracting the noise voltage from, a DC voltage output from a power source; and
a current mirror circuit to convert the amplified input voltage into an input current and to remove a DC component from the input current to output the noise current.

7. The device of claim 6, wherein:
the current mirror circuit includes:
an NMOS transistor having a gate connected to an output terminal of the operational amplifier;
a resistor comprising a first end connected to a source of the NMOS transistor and a second end connected to ground;
a first PMOS transistor comprising a first end connected to a drain of the NMOS transistor and a second end connected to a power supply source; and
a second PMOS transistor comprising a gate connected to a gate of the first PMOS transistor, a source connected to the power supply source, and a drain connected to the ground,
the noise current obtained by removing the DC component from the input current is output via an output terminal connected to a drain of the second PMOS transistor.

8. The device of claim 1, wherein the sawtooth generator comprises a capacitor configured to convert a combination of a sawtooth current and the noise current into the sawtooth voltage signal and to output the sawtooth voltage signal.

9. The device of claim 1, further comprising a pulse-width modulation (PWM) comparison circuit which is configured to compare the sawtooth voltage signal output from the sawtooth generator with a reference voltage to output a PWM signal.

10. The device of claim 9, comprising a power management circuit, wherein the switching regulator is included in the power management circuit.

11. The device of claim 10, wherein the power management circuit further comprises a controller configured to convert the PWM signal output from the switching regulator into a driving signal and to output the driving signal.

12. The device of claim 11, further comprising a peripheral circuit including a driving circuit that operates in response to the driving signal.

13. A method, the method comprising:
converting, by a voltage-to-current converter, a noise voltage into a noise current and outputting the noise current; and
outputting, by a sawtooth generator, a sawtooth voltage signal having a sawtooth waveform, wherein a frequency of the sawtooth waveform varies according to a level of the noise current.

14. The method of claim 13, wherein the converting comprises:
amplifying and outputting, by an operational amplifier, an input voltage formed by adding the noise voltage to, or subtracting the noise voltage from, a DC voltage output from a power source; and
converting, by a current mirror circuit, the amplified input voltage into an input current and removing a DC component from the input current to output the noise current.

15. A device, including:
a sawtooth generator configured to receive a noise current and in response thereto to output a sawtooth voltage signal having sawtooth waveform with a variable period, wherein the variable period of the sawtooth waveform varies in response to the noise current; and
a pulse width modulation (PWM) signal generator configured to receive the sawtooth voltage signal having the sawtooth waveform with the variable period, and receiving a comparison voltage, and to compare the sawtooth voltage signal to the comparison voltage and in response thereto to output a pulse width modulation signal having a variable frequency, wherein the variable frequency varies in response to the noise current.

16. The device of claim 15, further comprising an error amplifier configured to supply the comparison voltage to the PWM signal generator, wherein the error amplifier is configured to receive an error signal representing a difference between a regulated output voltage and a target voltage to which the regulated voltage should be set, wherein the comparison signal varies in response to the regulated output voltage.

17. The device of claim 15, further comprising a voltage-to-current converter configured to convert a noise voltage into the noise current and to output the noise current to the sawtooth generator.

18. The device of claim 15, further comprising a controller configured to convert the PWM signal output from the PWM signal generator into a driving signal and to output the driving signal.

19. The device of claim 18, further comprising a peripheral circuit including a driving circuit that operates in response to the driving signal.

20. The device of claim 15, further comprising a switching device configured to selectively supply the noise current to the sawtooth generator.

\* \* \* \* \*